United States Patent
Krause et al.

(10) Patent No.: US 9,297,573 B2
(45) Date of Patent: Mar. 29, 2016

(54) APPLIANCE WITH A WATER FILTRATION SYSTEM

(71) Applicant: General Electric Company, Schentectady, NY (US)

(72) Inventors: Andrew Reinhard Krause, Louisville, KY (US); Jeffrey Michael Colyer, Louisville, KY (US); Russell J Fallon, Louisville, KY (US); Vinayak Reddy, Louisville, KY (US); Lorina June White, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/465,287

(22) Filed: Aug. 21, 2014

(65) Prior Publication Data

US 2015/0211784 A1     Jul. 30, 2015

Related U.S. Application Data

(63) Continuation of application No. 13/153,485, filed on Jun. 6, 2011, now Pat. No. 8,844,307.

(51) Int. Cl.
| | |
|---|---|
| *F25D 23/02* | (2006.01) |
| *F25D 23/04* | (2006.01) |
| *F25D 23/12* | (2006.01) |
| *B01D 35/02* | (2006.01) |
| *F25D 11/02* | (2006.01) |
| *F25D 21/04* | (2006.01) |

(52) U.S. Cl.
CPC ............... *F25D 23/04* (2013.01); *B01D 35/02* (2013.01); *F25D 11/02* (2013.01); *F25D 21/04* (2013.01); *F25D 23/126* (2013.01); *F25D 2323/121* (2013.01)

(58) Field of Classification Search
CPC .............. F25D 2323/121; F25D 23/04; F25D 223/021; F25D 23/023
See application file for complete search history.

(56) References Cited

U.S. PATENT DOCUMENTS

| | | | |
|---|---|---|---|
| 5,135,645 | A | 8/1992 | Sklenak et al. |
| 5,460,719 | A | 10/1995 | Clack et al. |
| 5,907,957 | A | 6/1999 | Lee et al. |
| 7,007,500 | B2 | 3/2006 | Lee |
| 7,121,109 | B2 | 10/2006 | Heims |
| 7,261,815 | B2 | 8/2007 | Cur et al. |
| 8,011,203 | B1 | 9/2011 | Schenk et al. |
| 2006/0080991 | A1 | 4/2006 | An et al. |
| 2006/0254971 | A1 | 11/2006 | Tubby et al. |
| 2008/0011008 | A1* | 1/2008 | Cur ............ F25D 23/126 62/338 |
| 2008/0258597 | A1 | 10/2008 | Kwon et al. |
| 2010/0126210 | A1 | 5/2010 | Rotter et al. |
| 2012/0000899 | A1 | 1/2012 | Eom et al. |

\* cited by examiner

*Primary Examiner* — Cassey D Bauer

(74) *Attorney, Agent, or Firm* — Dority & Manning, P.A.

(57) ABSTRACT

An appliance includes a main body defining an access opening; a door movably attached to the main body and configured to close the access opening in a closed position, the door comprising a front, a back, a side surface extending from the front to the back, and a recess formed in the side surface, the back facing the main body when the door is in the closed position; and a water filtration system comprising a filter disposed in the recess.

18 Claims, 11 Drawing Sheets

APPLIANCE WITH A WATER FILTRATION SYSTEM

CROSS REFERENCE TO RELATED APPLICATION

The present application is a continuation of U.S. patent application Ser. No. 13/153,485, filed Jun. 6, 2006, which is incorporated herein by reference.

BACKGROUND OF THE INVENTION

The present disclosure relates generally to an appliance with a water filtration system. More particularly, the present disclosure relates to an appliance such as a refrigerator with a water filtration system having a filter that is positioned in a location that is normally hidden from a user's view yet provides a relatively easy access to the user for filter replacement.

Currently, many refrigerators have a water dispenser and/or an ice maker. The water dispenser and/or the ice maker may include a water reservoir fluidly connected to a water source, which is often a municipal water source. The refrigerator may also have a water filter through which water is passed to filter the water before the water is deposited in the water reservoir or dispensed via the water dispenser.

For aesthetic reasons, it is generally desirable to hide the water filter from a user's view. This is usually accomplished by placing the water filter in places such as the bottom or back of the refrigerator. While this approach may preserve a sleek outer appearance of the refrigerator, it creates some problems for the user.

First of all, since it is often difficult for the user to see the water filter located in such places, the user may use the refrigerator without even realizing that the water filter is present or that it needs to be replaced periodically. Secondly, even if the user is aware of the existence of the water filter, the user may not be able to easily move or lift the refrigerator as the refrigerator is relatively heavy. This is particularly true for senior citizens and people with physical disabilities. This inconvenient movement may be necessary in order to replace the existing water filter with a new one.

Thirdly, by placing the water filter in places such as the bottom or back of the refrigerator, the manufacturer may need to route the water supply conduit for the water filter through a freezer compartment. Additional time, material, energy, and expense may be needed in order to ensure that the temperature inside the water supply conduit does not reach the water freezing temperature which can prevent the water dispenser and/or the ice maker from proper operating.

In some refrigerators, the water filter is disposed in the fresh food compartment, typically being proximate to the upper rear region of the fresh food compartment and being supported from the top wall thereof. The water filter is often not replaced in a timely fashion because it is usually obscured from view by items on the shelf and the users need to move items out of the way when replacing such a water filter.

BRIEF DESCRIPTION OF THE INVENTION

As described herein, the various exemplary embodiments of the present disclosure overcome one or more of the above or other disadvantages known in the art.

One aspect of the present disclosure relates to an appliance comprising a main body; a door movably attached to the main body, the door comprising a front, a back, a side surface extending from the front to the back, and a recess formed on the side surface; and a water filtration system comprising a filter disposed in the recess.

Another aspect of the present disclosure relates to a refrigerator comprising a main body; a first door and a second door, both of which are movably attached to the main body, the first door comprising a front, a back, a side flange between the front and the back, and a recess formed on the side flange, the side flange facing the second door when both the first door and the second door are closed; and a water filtration system comprising a filter disposed in the recess.

Yet another aspect of the present disclosure relates to an appliance comprising a main body; a door movably attached to the main body, the door comprising a front, a back, a side surface extending from the front to the back, and a recess formed on the side surface; and a manifold disposed in the recess and configured to receive a filter.

These and other aspects and advantages of the present disclosure will become apparent from the following detailed description considered in conjunction with the accompanying drawings. It is to be understood, however, that the drawings are designed solely for purposes of illustration and not as a definition of the limits of the disclosure, for which reference should be made to the appended claims. Moreover, the drawings are not necessarily drawn to scale and that, unless otherwise indicated, they are merely intended to conceptually illustrate the structures and procedures described herein.

DETAILED DESCRIPTION OF THE EXEMPLARY EMBODIMENTS OF THE INVENTION

It is contemplated that the teaching of the present disclosure is applicable to all types of refrigerators that have water filters. The present disclosure is therefore not intended to be limited to any particular type of refrigerator or configuration described in the exemplary embodiments. In addition, it should be appreciated that the present disclosure may be applicable to other types of appliances that have water filters, including but not limited to, water dispensers, appliances with faucets, ice dispensers, icemakers, food manufacturing equipment, freezers, etc.

Figure 1:
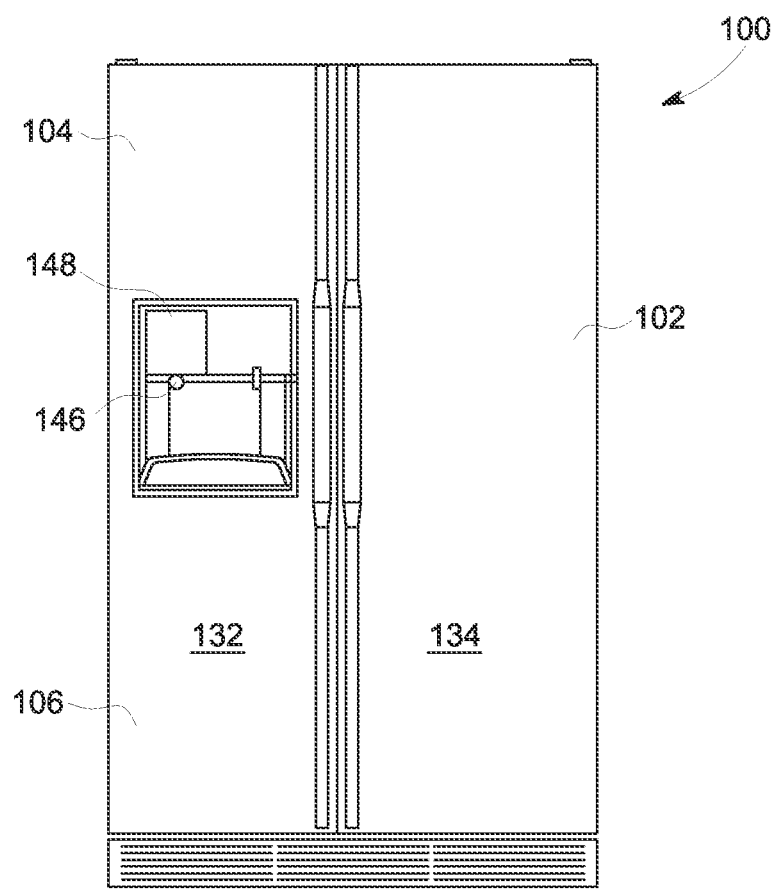
FIG. 1 is a front view of a refrigerator incorporating an embodiment of the present invention.

FIG. 1 illustrates a side-by-side refrigerator 100 that includes a fresh food compartment 102 and a freezer compartment 104, arranged in a side-by-side configuration. Preferably, the refrigerator 100 also includes a water dispenser 146 and a user interface 148.

Figure 2:
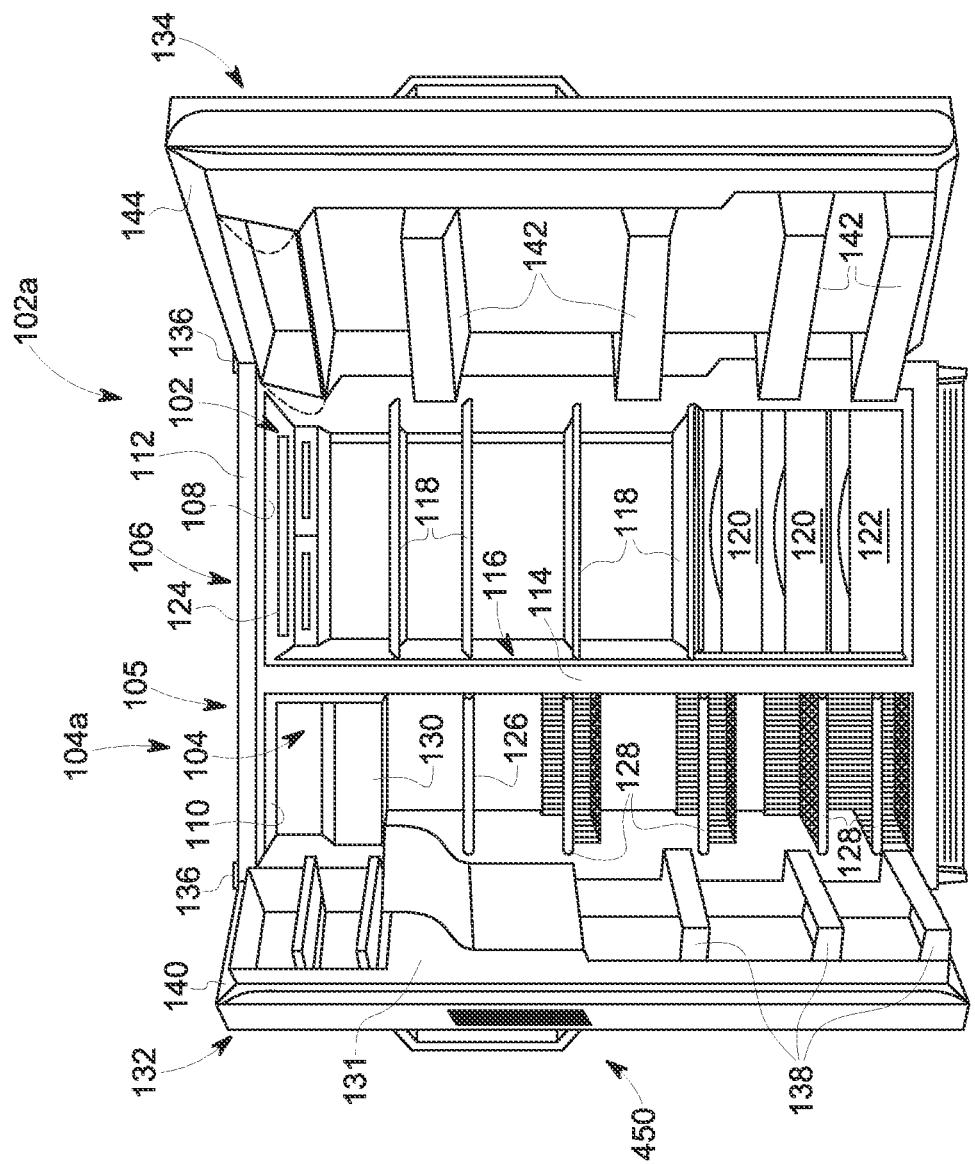
FIG. 2 is a front view of the refrigerator of FIG. 1 with the doors being in open positions.

As shown in FIG. 2, the fresh food compartment 102 and the freezer compartment 104 are defined by a main body or chassis 105 of the refrigerator 100, and have front access openings 102a, 104a, respectively. The main body 105 includes an outer case 106 and inner liners 108, 110. The space between the outer case 106 and the inner liners 108, 110 as well as the space between the inner liners 108 and 110 that corresponds to the mullion is filled with foamed-in-place insulation.

The outer case 106 usually is formed by folding a sheet of a suitable material, such as pre-painted steel, into an inverted U-shape to form top and side walls of the outer case 106. A bottom wall of the outer case 106 usually is formed separately and attached to the outer case side walls and to a bottom frame that provides support for refrigerator 100. The inner liners 108, 110 are molded from a suitable plastic material. Alternatively, the inner liners 108, 110 may be formed by bending and welding a sheet of a suitable metal, such as steel. The illustrative embodiment includes two separate inner liners 108, 110 as the refrigerator 100 is a relatively large capacity unit and separate inner liners add strength and are easier to maintain within manufacturing tolerances. In smaller refrigerators, a single inner liner can be used, and a mullion spans between opposite sides of the single inner liner to divide the space into the freezer compartment 104 and the fresh food compartment 102.

A breaker strip 112 extends between the outer case front flange and the outer front edges of inner liners 108, 110. The breaker strip 112 can be formed of a suitable resilient material, such as an extruded acrylo-butadiene-styrene based material (commonly referred to as ABS).

The insulation in the space between the inner liners 108, 110 is covered by another strip of suitable resilient material, which is also commonly referred to as a mullion 114. In one embodiment, the mullion 114 is also preferably formed of an extruded ABS material. Breaker strip 112 and mullion 114 form a front face, and extend completely around inner peripheral edges of the outer case 106 and vertically between the inner liners 108, 110. The mullion 114, the insulation between the compartments 102, 104, and the inner liners separating the compartments 102, 104, sometimes are collectively referred to as a center mullion wall 116.

Shelves 118 and slide-out drawers 120 are usually provided in the fresh food compartment 102 to support items to be stored therein. A bottom drawer or pan 122 may form a quick chill and thaw system that is selectively controlled, together with other refrigerator features, by a controller (not shown) according to user's preference via manipulation of a control interface 124 which is usually mounted in an upper region of the fresh food compartment 102 and coupled to the controller.

A shelf 126 and wire baskets 128 are provided in the freezer compartment 104. The controller is configured to control the operation of the refrigerator 100, as is known in the art. The freezer compartment 104 preferably includes an automatic ice maker 130. An ice dispenser 131 is provided in freezer door 132 so that ice can be obtained without opening the freezer door 132. As is known in the art, the ice maker 130 includes a number of electromechanical elements that manipulate a mold to shape ice as it freezes, a mechanism to remove or release ice from the mold, and an ice bucket for storage of ice released from the mold. Periodically, the ice supply is replenished by the ice maker 130 as ice is removed from the ice bucket. The storage capacity of the ice bucket is generally sufficient for normal use of the refrigerator 100.

The freezer door 132 and the fresh food door 134 selectively close the access openings 102a, 104a of the fresh food compartment 102 and the freezer compartment 104, respectively. Each door 132, 134 is movably mounted or attached to the main body 105 by a top hinge 136 and a bottom hinge (not shown) to rotate about its outer vertical edge between an open position, as shown in FIG. 2, and a closed position, as shown in FIG. 1. As shown in FIG. 2, freezer door 132 includes a plurality of storage shelves 138 and a sealing gasket 140, and fresh food door 134 also includes a plurality of storage shelves 142 and a sealing gasket 144.

The refrigerator 100 uses a sealed refrigeration system to cool the fresh food compartment 102 and the freezer compartment 104. The principle and components of the sealed refrigeration system are well known in the art and therefore will not be described in detail here.

Figure 4:
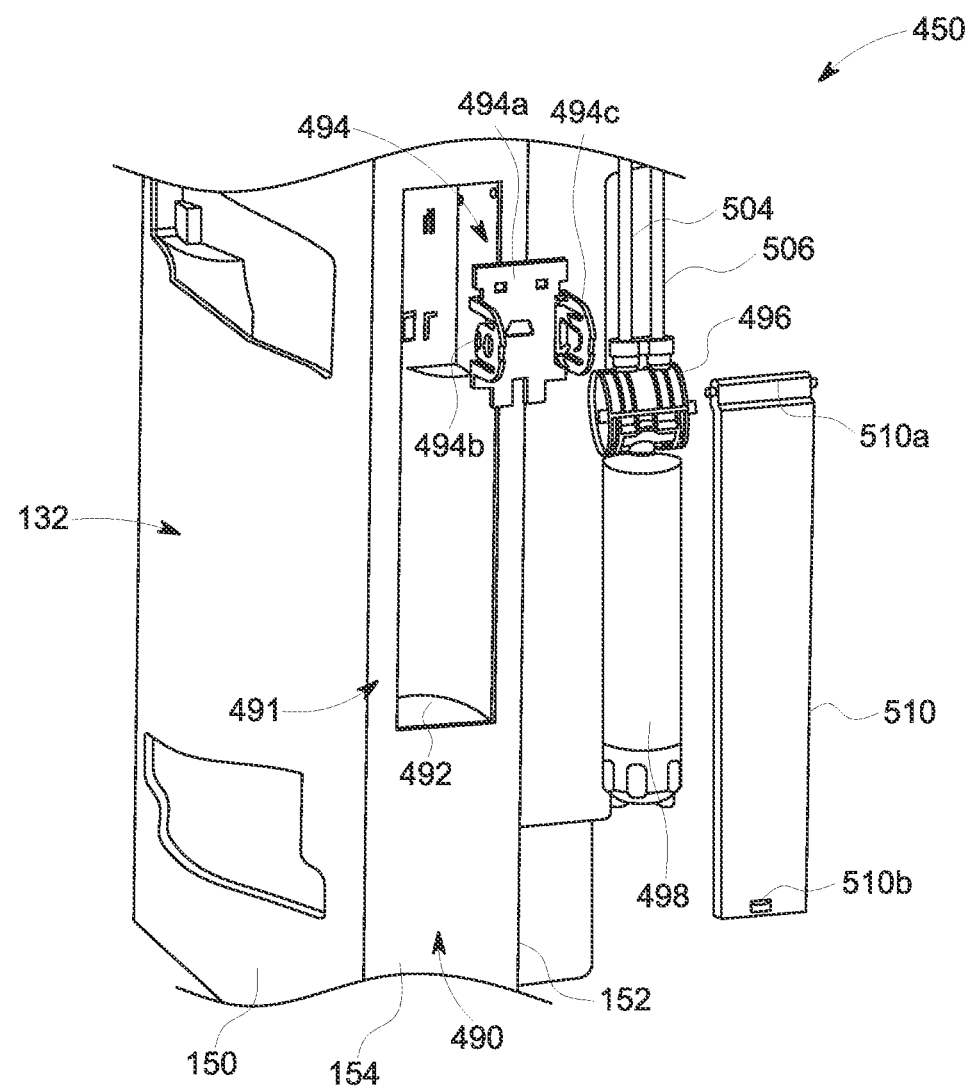
FIG. 4 is a partial, exploded, perspective view of a door of the refrigerator of FIG. 1, illustrating the water filtration system thereof.

Turning now to FIG. 4, there is shown part of the freezer door 132. The freezer door 132 has a front 150, a back 152, and a side surface 154 disposed between the front 150 and the back 152. In the embodiment shown in FIG. 4, the side surface 154 extends from the front 150 to the back 152. The side surface 154 has a top portion or top flange (not shown), a bottom portion or bottom flange (not shown), an outer side portion or outer side flange (not shown), and an inner side portion or inner side flange 490 that faces the fresh food door 134 when both the freezer door 132 and the fresh food door 134 are closed.

In the embodiment shown in FIG. 4, the inner side flange 490 has a recess 491 which is preferably defined by a housing 492 disposed in the freezer door 132. The housing 492, which can be considered part of a water filtration system 450 of the refrigerator 100, is in the form of an open receptacle. Foam or insulation that would occupy the space in the freezer door 132 that corresponds to the housing 492 can be carved out by any known means. For example, during foam or insulation formation, a plug (not shown) corresponding to the space for the housing 492 can be placed in the appropriate location to carve out the space. Alternatively, the housing 492 can be positioned in place before foaming operation is performed on the door. In FIG. 4, the housing 492 is shown as having a generally rectangular opening, but it can have an opening of any shape.

As clearly shown in FIG. 4, the water filtration system 450 also includes a manifold bracket 494, a manifold 496, a filter or filter canister 498, and a cover 510.

Figure 5:
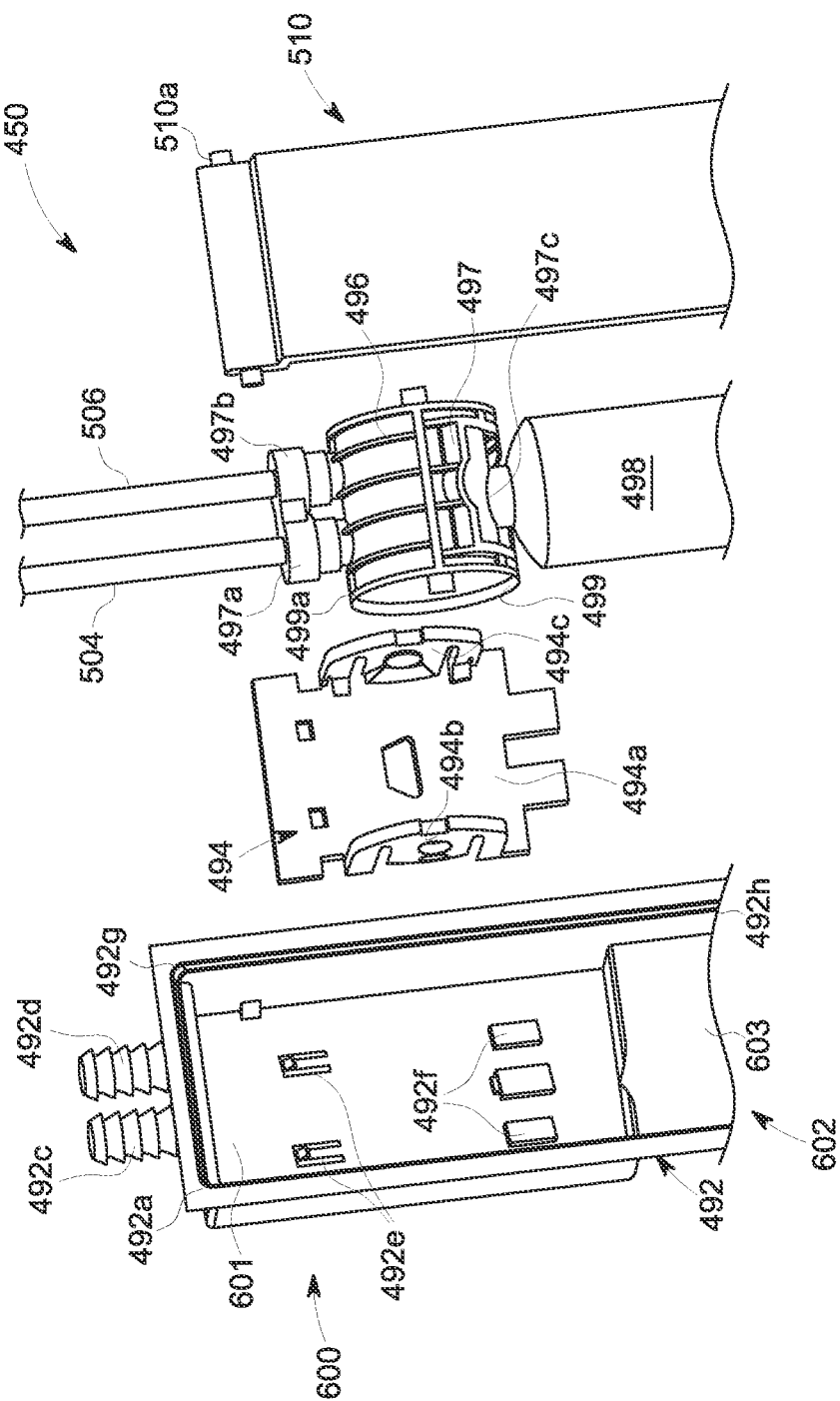
FIG. 5 is an exploded close up view of the water filtration system of FIG. 4.

As shown in FIGS. 4 and 5, the housing 492 has a first, upper portion 600 with a substantially flat back wall 601, and a second, lower portion 602 with a curved back wall 603. In addition, the housing 492 has a border, trim or flange 492a, which forms the frontal external periphery of the housing 492 (relative to the back walls 601, 603 of the housing 492). Preferably, the border 492a continuously extends on all sides of the opening of the housing 492, and is substantially flush with the inner side flange 490 of the freezer door 132 when the housing 492 is installed in the freezer door 132. In other embodiments, the housing 492 can have a trimless or flangeless design. The housing 492 preferably has a sufficient depth so that the manifold bracket 494, the manifold 496 and the filter canister 498 can be completely disposed in the housing 492 (see FIG. 6). The housing 492 also has a first hollow barbed connector 492c and a second hollow barbed connector 492d that preferably extend outwardly or upwardly from the top wall of the housing 492. The barbed connectors 492c, 492d are used to connect conduit sleeves 524, 526 (see FIG. 8) thereon. The conduit sleeves 524, 526 receive the respective water conduits 504, 506 for the water filtration system 450 that pass through the barbed connectors 492c, 492d. The conduit sleeves 524, 526 are used so that the conduits 504, 506 can easily slide through the interior of the freezer door 132 after the door is foamed. The conduit sleeves 524, 526 are also used to facilitate the service and replacement of the manifold 496 and/or the conduits 504, 506 in the field if necessary.

Figure 9:
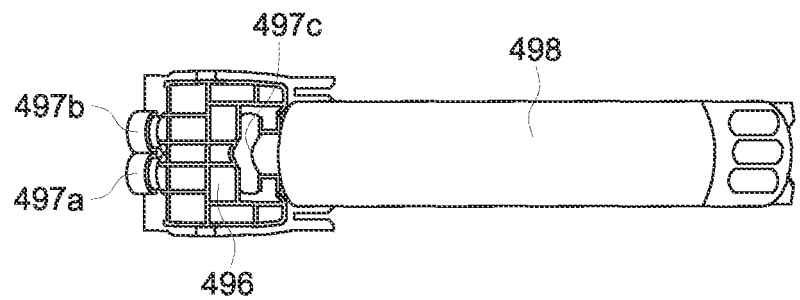
FIGS. 9 and 10 show that the filter canister of the water filtration system is attached to the manifold.
Figure 10:
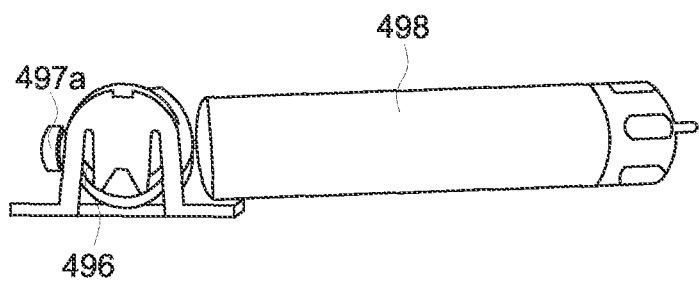

The manifold bracket 494 includes a substantially rectangular base member 494a and a pair of substantially arcuate-shaped support members 494b and 494c extending outwardly from the base member 494a. Preferably, the base member 494a is attached to the flat back wall 601 of the upper portion 600 of the housing 494 by engaging one or more latches or projections 492e, 492f formed on the flat back wall 601. The manifold 496 is disposed between and held in place by the pair of support members 494b, 494c, as is also shown in FIGS. 9 and 10.

In the embodiments shown, the manifold 496 includes an inner part 497 and an outer part 499 which rotatably supports the inner part 497. As illustrated in FIG. 5, the inner part 497 has an inlet port 497a for receiving unfiltered water from a water supply via the conduit 504 and an outlet port 497b for supplying filtered water via the conduit 504 to, for example, the water dispenser 146, the ice maker 130, and/or a water reservoir for these devices. The inner part 497 also has a connection port 497c for releasably receiving the filter canister 498. The outer part 499 has two disk-shaped ends 499a that are snapped to the support members 494b, 494c (see also FIGS. 9 and 10). The structure of the manifold 496 is identical or substantially similar to that of a manifold sold by 3M Company for use with a water filter canister model number 3US-AF01 also sold by 3M Company. In other embodiments, any manifold can be used as long as it can satisfactorily work with a corresponding filter canister.

Figure 11:
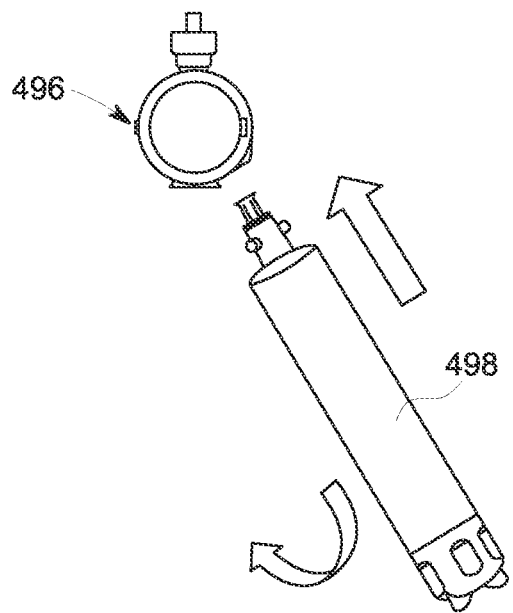
FIGS. 11 and 12 schematically illustrate how the filter canister is attached to and removed from the manifold, respectively.
Figure 12:
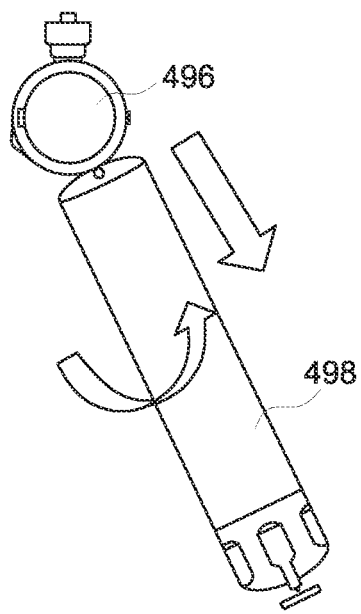

In the embodiment shown, the filter canister 498 is generally cylindrically shaped. The filter canister 498 has a casing and suitable filter medium (not shown) disposed in the casing. The filter canister 498 defines therein a filtration path (not shown), which passes through the filter medium and is in flow communication with the inlet port 497a and the outlet port 497b when the filter canister 498 is removably attached to the manifold 496. In one embodiment, the filter canister 498 is the filter canister marketed by 3M Company, model number 3US-AF01, and therefore will not be discussed in detail here. As illustrated in FIG. 11, a user can removably and water-tightly attach the filter canister 498 to the manifold 496 by first inserting the top portion of the filter canister 498 into the connection port 497c of the inner part 497 of the manifold 496, and then by rotating the filter canister 498 relative to the manifold 496 in a predetermined direction. As illustrated in FIG. 12, the user can remove the filter canister 498 from the manifold 496 by reversing the order. In other embodiments, the filter canister 498 can be any filter canister so long as it can satisfactorily work with the corresponding manifold and provide the desired water filtration.

Figure 6:
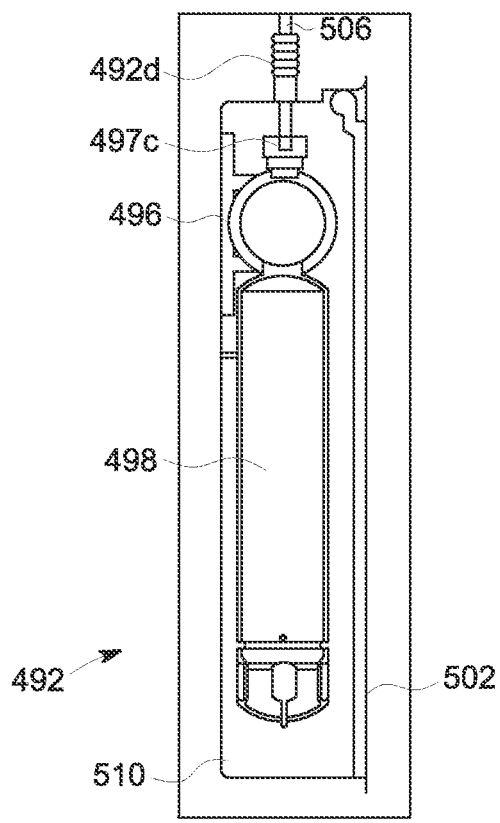
FIG. 6 is a side view of the water filtration system of FIG. 4.

As shown in FIGS. 4-6, the cover 510 is provided to selectively cover the filter canister 498. Preferably, the cover 510 is rotatably attached to the housing 492 to selectively close the access opening of the housing 492. More particularly, the cover 510 includes a pair of pins 510a which are positioned adjacent to the top of the generally rectangular shaped main body of the cover 510 and are rotatably disposed in the respective apertures 492g of the housing 492. As can be seen from FIG. 5, preferably the housing 492 has a recessed area 492h around the access opening thereof to receive the cover 510 when the cover 510 is in its closed position so that the cover 510 in its closed position will be substantially flush with the frontal external periphery of the housing 492 and/or the inner side flange 490.

Figure 7:
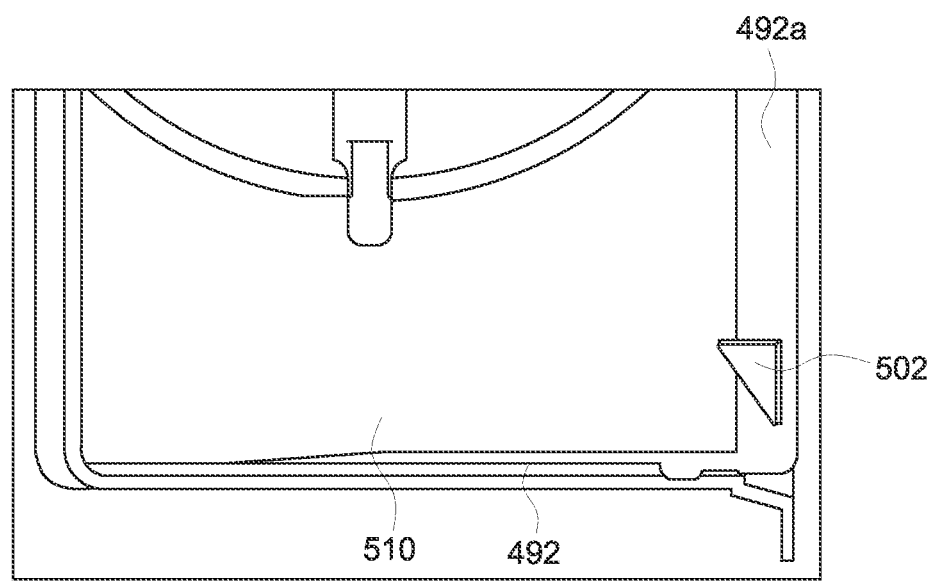
FIG. 7 is a partial, enlarged view of the housing of the water filtration system of FIG. 4.
Figure 13:
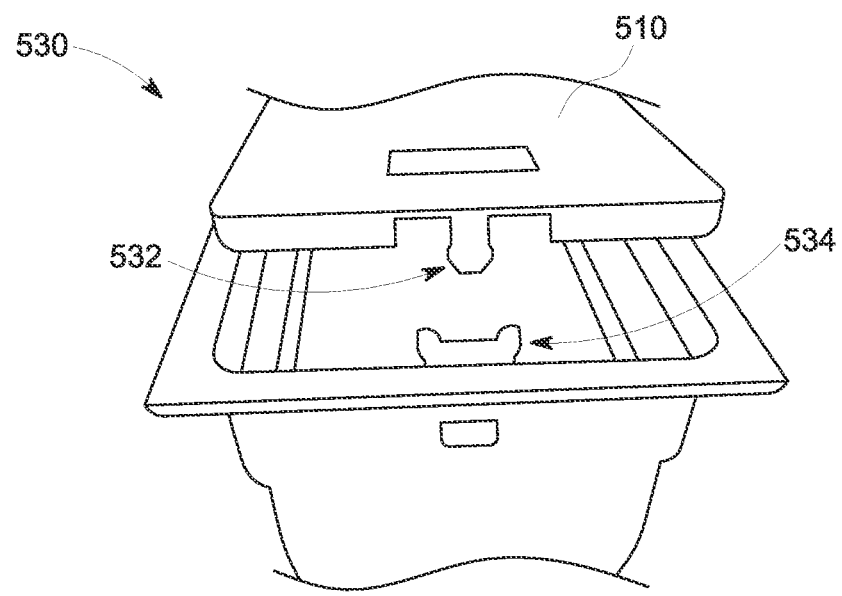
FIGS. 13 and 14 schematically show another embodiment of the housing and the cover of the water filtration system.
Figure 14:
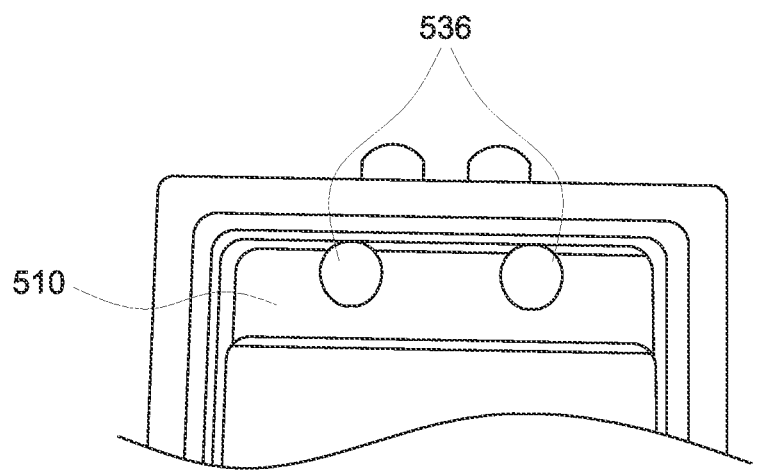
Figure 15:
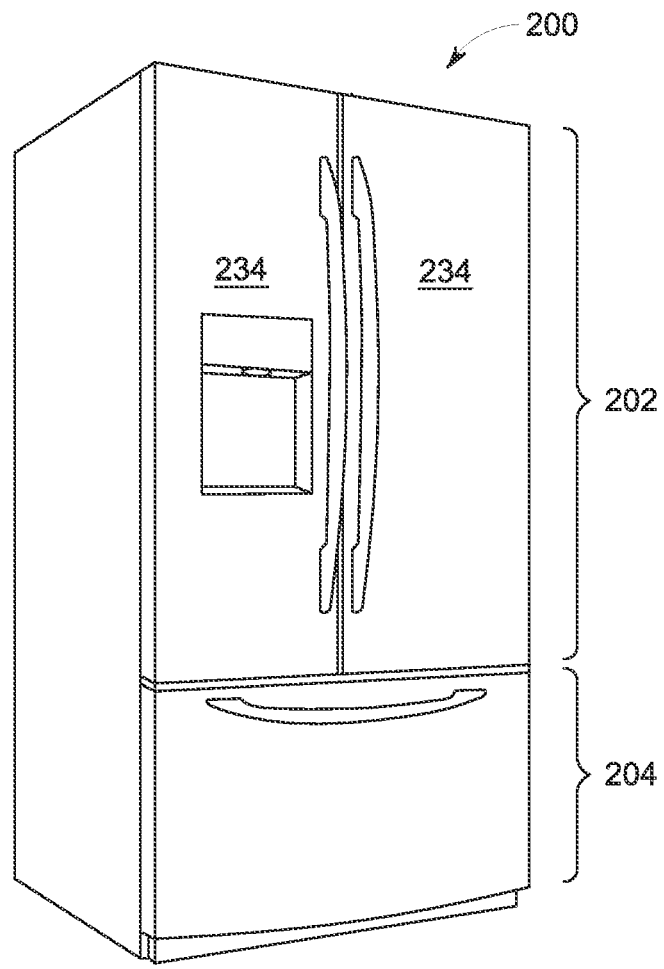
FIG. 15 shows another refrigerator incorporating an embodiment of the present invention.

Also preferably, the main body of the cover 510 has a recess 510b which functions as a handle so that a user can use it to easily open or close the cover 510. Preferably, the main body of the cover 510 is transparent or has a window so that a user can see the filter canister 498 when opening or closing the freezer door 132. As clearly shown in FIG. 7, a rotatable block 502 can be disposed on the frontal external periphery of the housing 492, near the bottom thereof, to keep the cover 510 in its closed position so that the cover 510 will not open unexpectedly or accidentally. As illustrated in FIGS. 13 and 14, alternatively or additionally, a push-to-open type of latch mechanism 530 can be used to keep the cover 510 in its closed position. In the embodiment shown in FIGS. 13 and 14, the snap element 532 of the latch mechanism 530 is attached to the housing 492 while the latch element 534 is attached to the cover 510. In addition, two projections or stoppers 536 are provided on the upper portion of the main body of the cover 510 to limit the opening angle of the cover 510 relative to the housing 492. Of course, the snap element 532 and the latch element 534 can be attached to the cover 510 and the housing 492, respectively, and the stoppers 536 can be provided on the upper external periphery of the housing 492.

Figure 8:
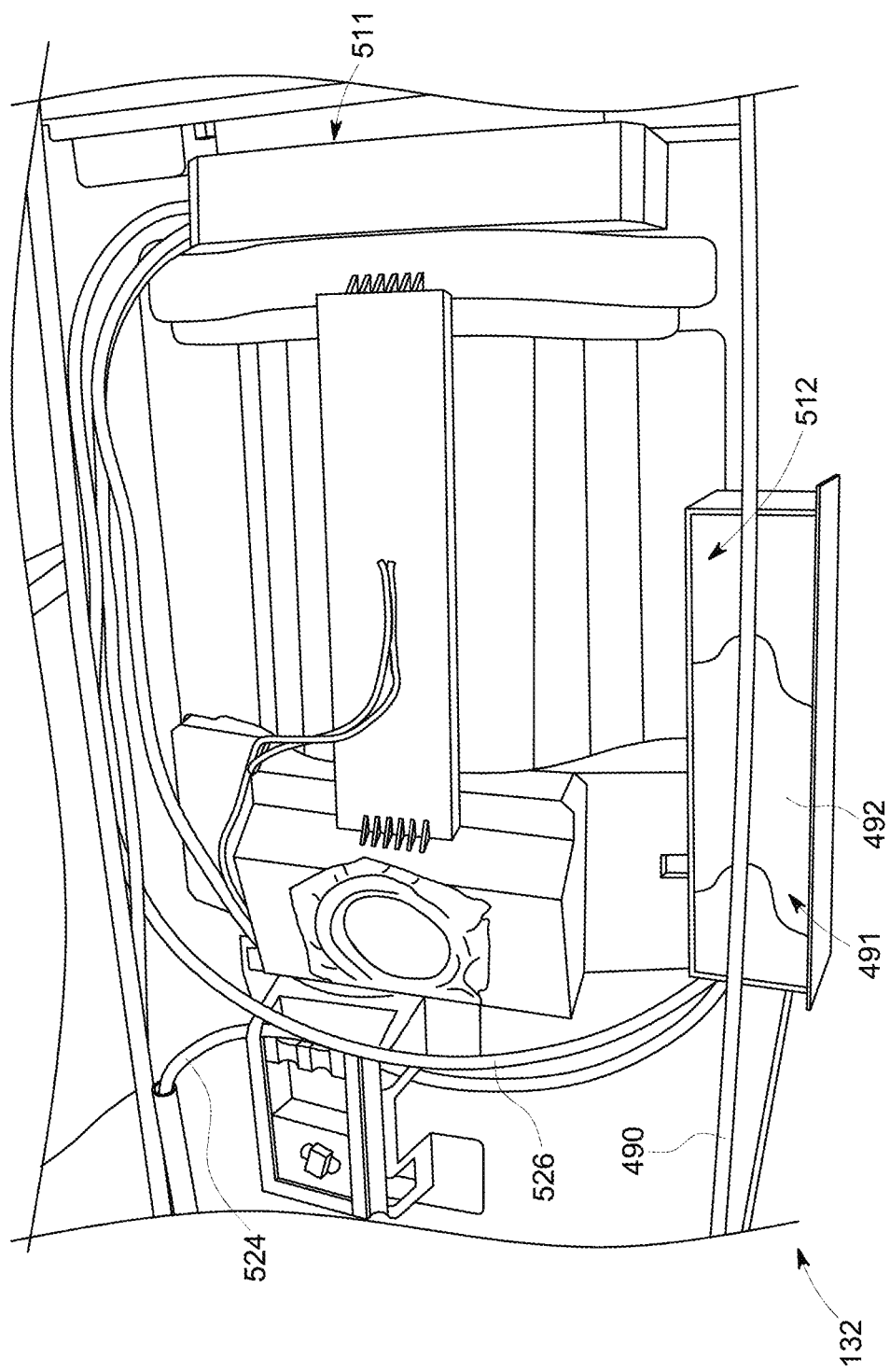
FIG. 8 is a partial back view of the door of FIG. 4, with its back being removed and the housing of the water filtration system being moved outward.

As shown in FIG. 8, preferably an electric heater such as a foil heater 512 is disposed in the freezer door 132 and in thermal communication with the housing 492 to prevent condensation on the housing 492 and its surrounding area. More specifically, in the embodiment shown, the foil heater 512 is preferably attached to and substantially covers one lateral side of the housing 494 to eliminate or substantially reduce condensation on the inside of the housing 494 which might be caused by the lesser foam thickness in the freezer door 132 surrounding the housing 492. The foil heater 512 can be controlled by the controller of the refrigerator 100.

The conduit 504 and its sleeve 524 can enter the freezer door 132 through its top hinge 136. The conduit 506 is fluidly connected to a valve 511, which in this embodiment is also disposed in the freezer door 132. The valve 511 selectively allows filtered water to flow to another location such as the water reservoir, the ice maker 130, the water dispenser 146.

In operation, when a user decides to replace the filter canister 498, the user opens the freezer door 132, opens the cover 510, grabs the filter canister 498, and rotates or tilts the filter canister 498 and the inner part 497 of the manifold 494 relative to the axis of the outer part 499 to pull at least the bottom part of the filter canister 498 outside of the housing 492. The user then rotates the filter canister 498 relative to its longitudinal axis to disengage it from the inner part 497 of the manifold 494, and pulls it out. The user can then attach a replacement filter canister to the manifold 494, rotatably pushes it into the housing 492, and closes the cover 510.

There are various modifications that are within the scope of the teaching of the present disclosure. For example, the recess 491 can be formed on the top flange, the outer side flange, or the bottom flange of the freezer door 132 instead of on the inner side flange 490. In addition, the recess 491 can be formed on the side surface of the fresh food door 134. The inventive approach is equally applicable to other types of refrigerators, such as, for example, top mount refrigerators, bottom mount refrigerators and freezers. For example, FIG.

Figure 3:
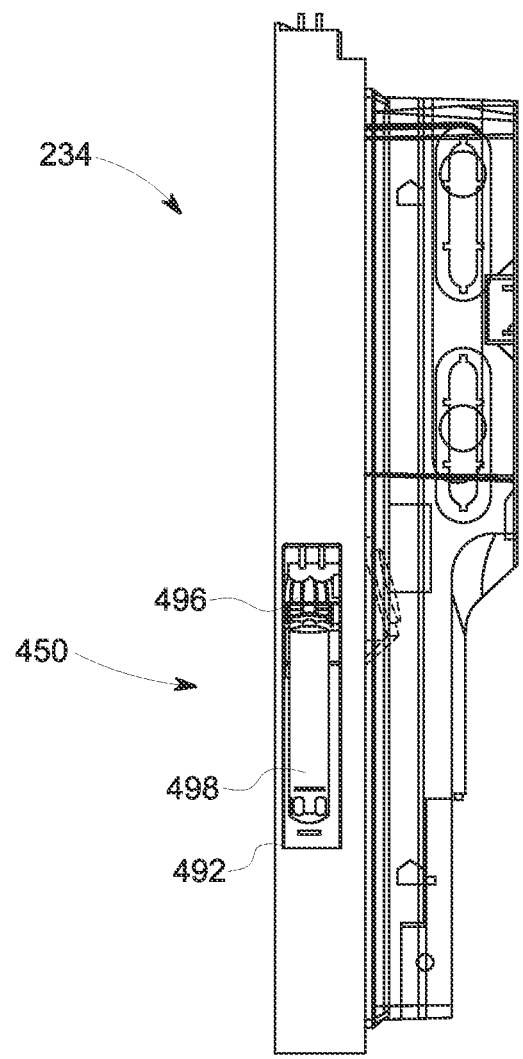
FIG. 3 shows a door of the refrigerator of FIG. 15.

15 shows a bottom mount refrigerator 200 that incorporates the teaching of the present disclosure. The refrigerator 200 has a fresh food compartment 202 which is positioned above a freezer compartment 204. FIG. 3 is a schematic side view of one of French doors 234 for the fresh food compartment 202 for the bottom mount refrigerator 200.

Thus, while there have shown and described and pointed out fundamental novel features of the disclosure as applied to various specific embodiments thereof, it will be understood that various omissions and substitutions and changes in the form and details of the apparatus illustrated, and in their operation, may be made by those skilled in the art without departing from the spirit of the disclosure. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An appliance comprising:
   a main body defining an access opening;
   a door movably attached to the main body and configured to close the access opening in a closed position,
   the door comprising a front, a back, a side surface extending from the front to the back, and a recess formed in the side surface, the back facing the main body when the door is in the closed position,
   a housing disposed in the door, the housing defining the recess; and
   a water filtration system, comprising
      a filter disposed in the recess;
      a bracket removably supported by the housing; and
      a manifold supported by the bracket,
   wherein the filter is removably attached to the manifold.

2. The appliance of claim 1, wherein the filter is configured to be removably attached to the manifold by inserting a top portion of the filter to the manifold, and rotating or tilting the filter relative to the manifold in a predetermined direction.

3. The appliance of claim 1, wherein the housing comprises an external periphery which is substantially flush with the side surface.

4. The appliance of claim 1, wherein the manifold comprises a water inlet which allows water from a water source to flow into the filter, and a water outlet which allows water to flow out of the filter.

5. The appliance of claim 4, wherein the water outlet is fluidly connected to a water dispenser, a water reservoir or an ice maker.

6. The appliance of claim 1, wherein the bracket comprises two spaced support members which are configured to engage and support the manifold.

7. The appliance of claim 1, further comprising a heater in thermal communication with the recess to prevent condensation on the recess.

8. The appliance of claim 1, further comprising a cover for selectively covering the filter.

9. The appliance of claim 1, wherein the appliance is a refrigerator.

10. A refrigerator comprising:
    a main body defining at least one access opening;
    a first door and a second door, both of which are movably attached to the main body and are configured to close the at least one access opening in a closed position, the first door comprising a front, a back, a side flange between the front and the back, and a recess formed in the side flange and defined by a housing disposed in the first door, the side flange facing the second door when the first door and the second door are in the closed position; and
    a water filtration system comprising
       a filter disposed in the recess;
       a bracket removably supported by the housing; and
       a manifold supported by the bracket, wherein the filter is removably attached to the manifold.

11. The refrigerator of claim 10, wherein the filter is configured to be removably attached to the manifold by inserting a top portion of the filter to the manifold, and rotating or tilting the filter relative to the manifold in a predetermined direction.

12. The refrigerator of claim 10, wherein the bracket comprises two spaced support members which are configured to engage and support the manifold.

13. The refrigerator of claim 10, further comprising a heater in thermal communication with the recess to prevent condensation on the recess.

14. The refrigerator of claim 10, further comprising a cover pivotally attached to the recess for selectively covering the filter.

15. The refrigerator of claim 10, wherein the housing comprises an external periphery which is substantially flush with the side flange.

16. The refrigerator of claim 10, wherein the main body defines a fresh food compartment and a freezer compartment, the at least one access opening comprising a first access opening of the fresh food compartment and a second access opening of the freezer compartment, the first door and the second door in the closed position are configured to close the first access opening and the second access opening, respectively.

17. The refrigerator of claim 10, wherein the main body defines a storage compartment, the at least one access opening comprising an access opening of the storage compartment, the first door and the second door being used to collectively close the access opening of the storage compartment.

18. The refrigerator of claim 10, further comprising:
    a component inside the main body; and
    a conduit configured to allow filtered water to flow from the filter to the component.

* * * * *